United States Patent
Iwabuchi

(10) Patent No.: US 9,282,512 B2
(45) Date of Patent: *Mar. 8, 2016

(54) COMMUNICATION CONTROL METHOD AND BASE STATION

(75) Inventor: Akinori Iwabuchi, Machida (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/122,167

(22) PCT Filed: May 24, 2012

(86) PCT No.: PCT/JP2012/063391
§ 371 (c)(1),
(2), (4) Date: Nov. 25, 2013

(87) PCT Pub. No.: WO2012/165307
PCT Pub. Date: Dec. 6, 2012

(65) Prior Publication Data
US 2014/0106811 A1    Apr. 17, 2014

(30) Foreign Application Priority Data

May 27, 2011 (JP) ................ 2011-119767

(51) Int. Cl.
*H04B 7/00* (2006.01)
*H04W 52/02* (2009.01)
*H04W 52/30* (2009.01)
*H04W 24/04* (2009.01)
*H04W 36/16* (2009.01)
*H04W 36/24* (2009.01)

(52) U.S. Cl.
CPC .......... *H04W 52/0206* (2013.01); *H04W 52/30* (2013.01); *H04W 24/04* (2013.01); *H04W 36/165* (2013.01); *H04W 36/24* (2013.01); *H04W 52/0296* (2013.01)

(58) Field of Classification Search
CPC ................................ H04W 72/0426
See application file for complete search history.

(56) References Cited

U.S. PATENT DOCUMENTS

| 8,611,906 B2 | 12/2013 | Mori et al. |
| 8,615,249 B2 | 12/2013 | Ahluwalia |
| 2001/0005677 A1* | 6/2001 | Dempo ............. H04W 36/0055 455/436 |
| 2009/0117852 A1* | 5/2009 | Loh ........................ H04W 24/04 455/67.11 |
| 2009/0196266 A1* | 8/2009 | Wu ........................ H04W 24/02 370/338 |
| 2009/0197603 A1* | 8/2009 | Ji ........................ H04W 36/0083 455/436 |

(Continued)

FOREIGN PATENT DOCUMENTS

| JP | 2002-330095 A | 11/2002 |
| JP | 2008-211645 A | 9/2008 |

(Continued)

OTHER PUBLICATIONS

3GPP TS 36.V9.2, Mar. 2010.*

(Continued)

*Primary Examiner* — Edward Urban
*Assistant Examiner* — Mohammed Rachedine
(74) *Attorney, Agent, or Firm* — Studebaker & Brackett PC

(57) ABSTRACT

A communication control method in a base station that includes a battery and is driven by power supplied from a power system or power supplied from the battery, comprises a transmission step of transmitting information indicating a remaining power amount of the battery to another base station.

8 Claims, 9 Drawing Sheets

(56) References Cited

U.S. PATENT DOCUMENTS

| | | |
|---|---|---|
| 2010/0159991 A1 | 6/2010 | Fu et al. |
| 2010/0265913 A1 | 10/2010 | Gorokhov et al. |
| 2011/0053598 A1 | 3/2011 | Ahluwalia |
| 2011/0065396 A1 | 3/2011 | Hirata |
| 2011/0130143 A1 | 6/2011 | Mori et al. |
| 2011/0158187 A1 | 6/2011 | Komamura et al. |
| 2012/0208543 A1 | 8/2012 | Takagi |
| 2012/0282930 A1 | 11/2012 | Ahluwalia |
| 2013/0072198 A1 | 3/2013 | Ahluwalia |
| 2013/0137433 A1 | 5/2013 | Ahluwalia |
| 2013/0143575 A1 | 6/2013 | Ahluwalia |
| 2013/0165135 A1 | 6/2013 | Ahluwalia |

FOREIGN PATENT DOCUMENTS

| | | |
|---|---|---|
| JP | 2011-049617 A | 3/2011 |
| JP | 2011-066593 A | 3/2011 |
| JP | 2011-511486 A | 4/2011 |
| WO | 2009/022534 A1 | 2/2009 |
| WO | 2010/072148 A1 | 7/2010 |
| WO | 2010/121199 A1 | 10/2010 |
| WO | 2011/046150 A1 | 4/2011 |

OTHER PUBLICATIONS

International Search Report; PCT/JP2012/063391; Jun. 19, 2012.
3GPP TR 36.902 V9.1.0 (Mar. 2010); 3rd Generation Partnership Project; Technical Specification Group Radio Access Network; Evolved Universal Terrestrial Radio Access Network (E-UTRAN); Self-configuring and self-optimizing network (SON) use cases and solutions (Release 9).
An Office Action, "Notice of Reasons for Rejection," issued by the Japanese Patent Office on Mar. 3, 2015, which corresponds to Japanese Patent Application No. 2011-119767 and is related to U.S. Appl. No. 14/122,167; with English language statement of relevance.
An Office Action, "Notice of Reasons for Rejection," issued by the Japanese Patent Office on Aug. 5, 2014, which corresponds to Japanese Patent Application No. 2011-119767 and is related to U.S. Appl. No. 14/122,167; with English language statement of relevance.

\* cited by examiner

FIG. 5

LOAD INFORMATION

| IE/Group Name | Presence | Range | IE type and reference | Semantics description |
|---|---|---|---|---|
| Message Type | M | | 9.2.13 | |
| Cell Information | M | | | |
| >Cell Information Item | | 1 to maxCellineNB | | |
| >>Cell ID | M | | ECGI 9.2.14 | Id of the source cell |
| >>UL Interference Overload Indication | O | | 9.2.17 | |
| >>UL High Interference Information | | 0 to maxCellineNB | | |
| >>>Target Cell ID | M | | ECGI 9.2.14 | Id of the cell for which the HII is meant |
| >>>UL High Interference Indication | M | | 9.2.18 | |
| >>Relative Narrowband Tx Power (RNTP) | O | | 9.2.19 | |
| >>ABS Information | O | | 9.2.54 | |
| >>Invoke Indication | O | | 9.2.55 | |
| >> Battery Indication | O | | | |

FIG. 8

RESOURCE STATUS REQUEST

| IE/Group Name | Presence | IE type and reference | Semantics description |
|---|---|---|---|
| Message Type | M | 9.2.13 | |
| eNB$_1$ Measurement ID | M | INTEGER (1..4095,...) | Allocated by eNB$_1$ |
| eNB$_2$ Measurement ID | C-ifRegistration Request Stop | INTEGER (1..4095,...) | Allocated by eNB$_2$ |
| Registration Request | M | ENUMERATED (start, stop,...) | A value set to "stop", indicates a request to stop all cells measurements. |
| Report Characteristics | O | BITSTRING (SIZE(32)) | Each position in the bitmap indicates measurement object the eNB$_2$ is requested to report.<br>First Bit = PRB Periodic,<br>Second Bit= TNL load Ind Periodic,<br>Third Bit = HW Load Ind Periodic,<br>Fourth Bit = Composite Available Capacity Periodic,<br>Fifth Bit = ABS Status Periodic,<br>Sixth Bit = Battery Status Periodic,<br>Bits 7 to 32 shall be ignored by the eNB$_2$ |
| Cell To Report | | | Cell ID list for which measurement is needed |
| >Cell To Report Item | | | |
| >>Cell ID | M | ECG 19.2.14 | |
| Reporting Periodicity | O | ENUMERATED (1000ms, 2000ms, 5000ms,10000ms, 5000ms,10000ms, ...) | |
| Partial Success Indicator | O | ENUMERATED (partial success allowed, ...) | Included if partial success is allowed. |

FIG. 9

RESOURCE STATUS UPDATE

| IE/Group Name | Presence | Range | IE type and reference |
|---|---|---|---|
| Message Type | M | | 9.2.13 |
| eNB1 Measurement ID | M | | INTEGER (1..4095,...) |
| eNB2 Measurement ID | M | | INTEGER (1..4095,...) |
| Cell Measurement Result | | 1 | |
| >Cell Measurement Result Item | | 1 to maxCellineNB | |
| >>Cell ID | M | | ECGI 9.2.14 |
| >>Hardware Load Indicator | O | | 9.2.34 |
| >>S1 TNL Load Indicator | O | | 9.2.35 |
| >>Radio Resource Status | O | | 9.2.37 |
| >>Composite Available CapacityGroup | O | | 9.2.44 |
| >> ABS Status | O | | 9.2.58 |
| >> Battery Status | O | | |

COMMUNICATION CONTROL METHOD AND BASE STATION

TECHNICAL FIELD

The present invention relates to a communication control method and a base station in a mobile communication system that supports a SON technology.

BACKGROUND ART

In an LTE (Long Term Evolution) being standardized in 3GPP (3rd Generation Partnership Project) which is a group aiming to standardize a mobile communication system, a technology called SON (Self Organizing Network) is employed. According to the SON technology, settings of the base station are expected to be automatically optimized without requiring a manual operation during the operation of a base station (see, for example Non Patent Literature 1).

Unfortunately, in the SON technology defined by a 3GPP standard, since a power situation represented by a recent massive blackout, etc., is not taken into account, there is a problem that it is impossible to appropriately optimize the settings of the base station.

CITATION LIST

Non Patent Literature

[Non Patent Literature 1] 3GPP technical report "TR 36.902 v9.1.0" March 2010

SUMMARY OF INVENTION

A feature of a communication control method according to the present invention is summarized as a communication control method in a base station that includes a battery and is driven by power supplied from a power system or power supplied from the battery, comprising a transmission step of transmitting information indicating a remaining power amount of the battery to another base station.

Another feature of the communication control method according to the present invention is, in the aforementioned feature, summarized as follows. In the transmission step, the information indicating the remaining power amount of the battery is periodically transmitted.

Another feature of the communication control method according to the present invention is, in the aforementioned feature, summarized as follows. The transmission step is executed based on a stoppage of the power supply from the power system.

Another feature of the communication control method according to the present invention is, in the aforementioned feature, summarized as follows. The communication control method further comprises: a step of detecting the stoppage of the power supply from the power system, wherein the transmission step includes a step of starting the transmission of the information indicating the remaining power amount of the battery or requesting the transmission of the information indicating the remaining power amount to another base station, when the stoppage of the power supply from the power system is detected or after a predetermined time elapses from the detection of the stoppage of the power supply from the power system.

Another feature of the communication control method according to the present invention is, in the aforementioned feature, summarized as follows. The communication control method further comprises: a step of obtaining information indicating an estimated time when the power supply from the power system is stopped, wherein the transmission step includes a step of starting the transmission of the information indicating the remaining power amount of the battery or requesting the transmission of the information indicating the remaining power amount to another base station, a predetermine time prior to the estimated time when the power supply from the power system is stopped.

Another feature of the communication control method according to the present invention is, in the aforementioned feature, summarized as follows. The communication control method further comprises: a step of receiving the transmission request from the another base station by using the interface, wherein the transmitting step is executed in response to the transmission request from the another base station.

Another feature of the communication control method according to the present invention is, in the aforementioned feature, summarized as follows. In the transmission step, the information indicating the remaining power amount of the battery is transmitted while being included in a LOAD INFORMATION message or a RESOURCE STATUS UPDATE message defined by a 3GPP standard.

A feature of a base station according to the present invention is summarized as a base station that includes a battery and is driven by power supplied from a power system or power supplied from the battery, comprising a transmission unit that transmits information indicating a remaining power amount of the battery to another base station.

BRIEF DESCRIPTION OF DRAWINGS

FIG. 5 is a diagram for describing IEs of a LOAD INFORMATION message.

FIG. 8 is a diagram for describing IEs of a RESOURCE STATUS REQUEST message.

FIG. 9 is a diagram for describing IEs of a RESOURCE STATUS UPDATE message.

DESCRIPTION OF EMBODIMENTS

A first embodiment, a second embodiment, and other embodiments of the present invention are described with

(1) First Embodiment

(1.1) Entire Configuration of System

Figure 1:
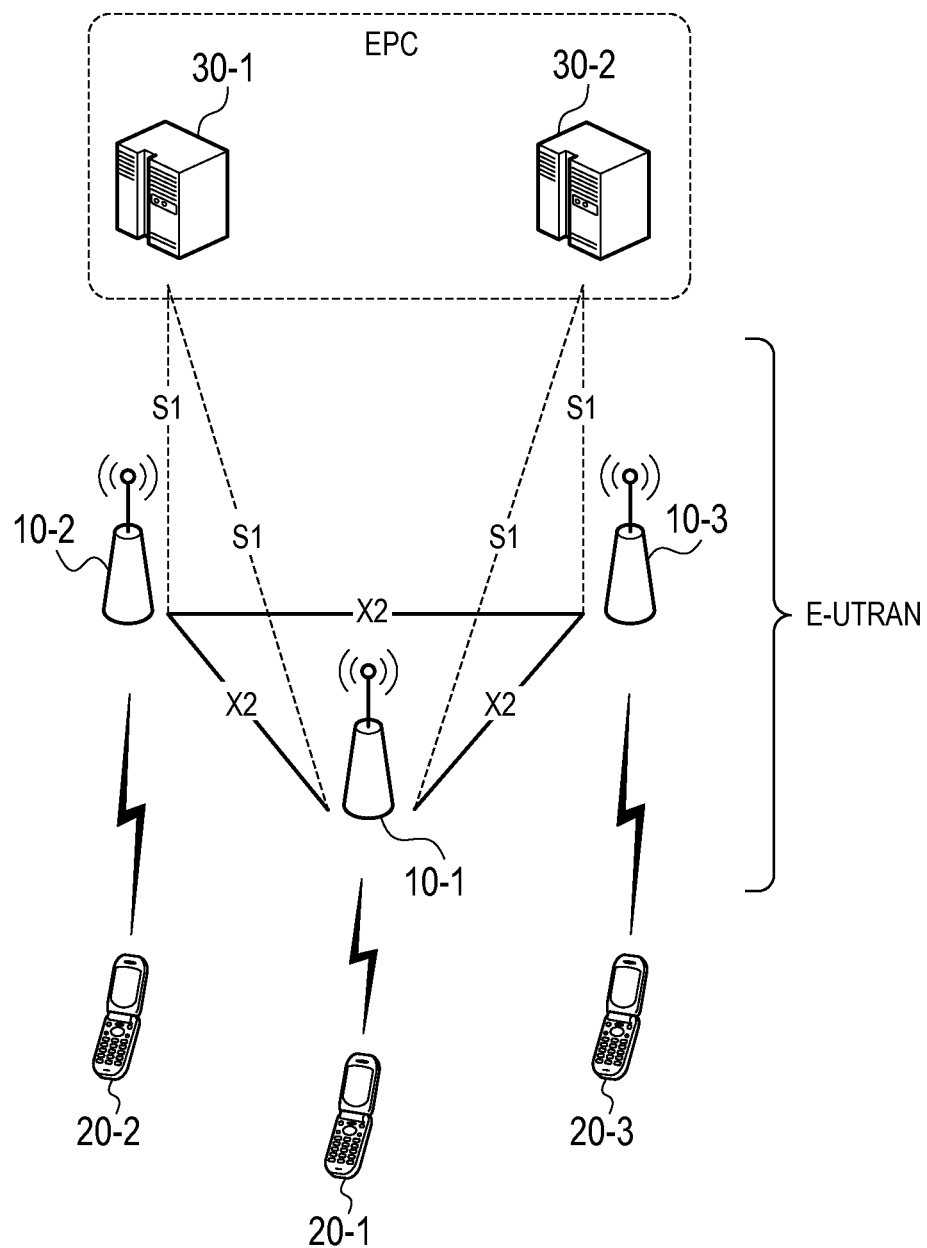
FIG. 1 is a diagram illustrating an entire configuration of a mobile communication system according to first and second embodiments.

FIG. 1 is a diagram illustrating an entire configuration of a mobile communication system 1. The mobile communication system 1 according to the present embodiment is configured based on an LTE Advanced (after 3GPP Release 10).

As illustrated in FIG. 1, the mobile communication system 1 includes E-UTRAN (Evolved-UMTS Terrestrial Radio Access Network) which is a radio access network. The E-UTRAN includes a plurality of base stations (eNBs; evolved Nodes B) 10.

Each of the plurality of base stations 10 is driven by power from a power system. As will be described in detail below, since the base station 10 is configured to include a battery, even though a stoppage of a power supply from the power system (namely, a blackout) occurs, the base station is configured to be capable of being driven by power accumulated in the battery.

Further, each of the plurality of base stations 10 forms one cell or a plurality of cells. Here, the cell is a minimum unit of a radio communication area where a radio terminal (UE; User Equipment) 20 can communicate.

The radio terminal 20-1 camps on a cell formed by the base station 10-1, and communicates with the base station 10-1. The radio terminal 20-2 camps on a cell formed by the base station 10-2, and communicates with the base station 10-2. The radio terminal 20-3 camps on a cell formed by the base station 10-3, and communicates with the base station 10-3.

The radio terminal 20 performs switching to a base station having a better radio condition along with the movement, for example. Such base station switching is called handover in a connection state, and is called cell reselection in an idle state. In the present mobile communication system, a base station to which the radio terminal 20 connects has the authority as to whether to perform handover of the radio terminal 20 and to which base station a handover is performed.

The mobile communication system 1 supports an MLB (Mobility Load Balancing) technology which is a kind of SON technologies, and is configured to be capable of adjusting a cell range (coverage) on the basis of load information transmitted and received among the base stations in order to level loads among the base stations.

In the mobile communication system 1, an X2 interface for mutually connecting the base stations 10 (adjacent to each other) is set. The base station 10 is configured to perform communication between base stations, that is, communicate with another base station 10 adjacent to the base station 10 by using the X2 interface.

Furthermore, the mobile communication system 1 includes EPC (Evolved Packet Core) which is a core network.

The EPC includes a plurality of mobility management devices (MME; Mobility Management Entity)/gateway devices (S-GW; Serving Gateway) 30. The mobility management device is configured to perform various mobility controls on the radio terminal 20. The gateway device is configured to perform transfer control of user data transmitted and received by the radio terminal 20.

An S1 interface for connecting each of the base stations eNB to the EPC is set between the base station 10 and the EPC. The base station 10 is configured to communicate with the EPC by using the S1 interface.

(1.2) Configuration of Base Station

Figure 2:
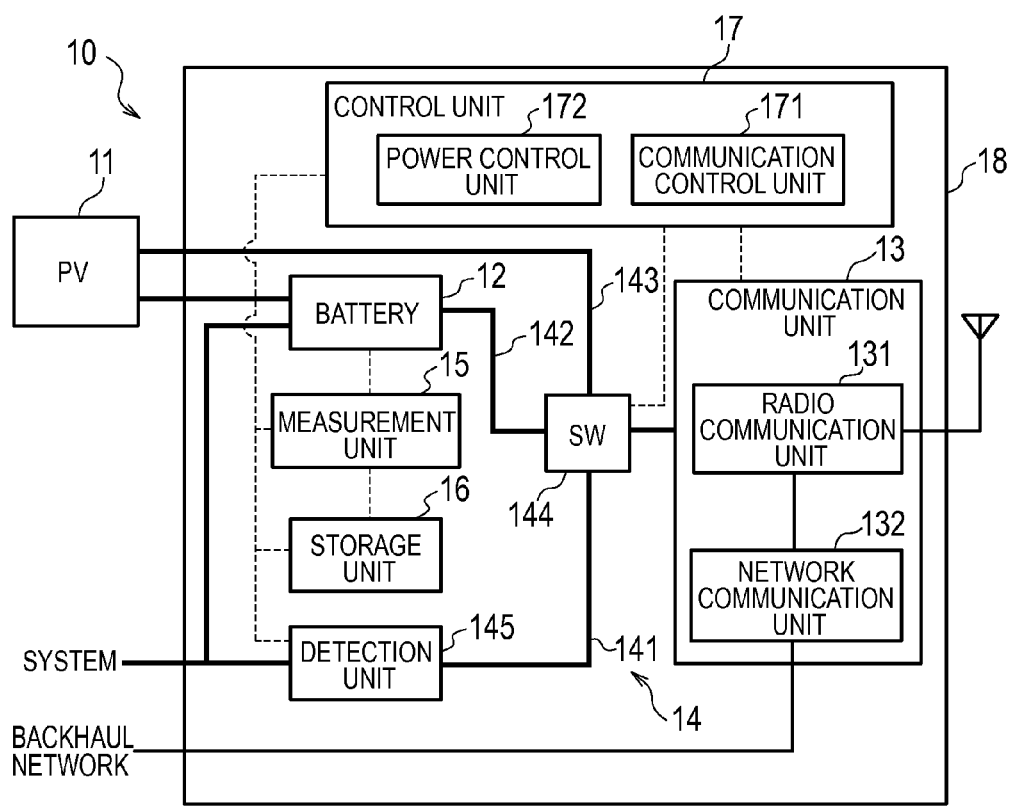
FIG. 2 is a block diagram of a base station according to the first and second embodiments.

Next, a configuration of the base station 10 is explained. FIG. 2 is a block diagram of the base station 10. In FIG. 2, a thick line between respective blocks represents a power line, a thin line represents a communication signal line, and a broken line represents a control signal line. Moreover, the power system indicates a distribution system of an electric power company, and a backhaul network indicates a communication infrastructure network constructed by a communication carrier.

As illustrated in FIG. 2, the base station 10 includes a solar power generation device (hereinafter, referred to as PV) 11, a battery 12, a communication unit 13, power transmission means 14, a measurement unit 15, a storage unit 16, and a control unit 17. In the present embodiment, the battery 12, the communication unit 13, the power transmission means 14, the measurement unit 15, the storage unit 16, and the control unit 17 are provided in a base-station main body (a case body) 18.

The PV 11 receives sunlight to generate electricity, and outputs power obtained by generating the electricity. In the present embodiment, the PV 11 is separated from the base-station main body 18, but may be integrally formed with the base-station main body 18.

In the present embodiment, a configuration where the base station 10 is provided with the PV 11 will be mainly described; however, the base station 10 may not be necessarily provided with the PV 11.

The communication unit 13 includes a radio communication unit 131 for performing radio communication with the radio terminal 20, and a network communication unit 132 for communicating with the network side (the EPC or another base station).

The battery 12 accumulates the power generated in the PV 11 and the power from the power system, and discharges the accumulated power under the control of the control unit 17. The battery 12 is, for example, a lithium-based battery, but may be a recyclable battery used in an electric vehicle. In the base station not including the PV 11, the battery 12 may be a type of a UPS (Uninterruptible Power Supply) system that accumulates the power from the power system.

The power transmission means 14 includes a path (a first path) 141 for transmitting the power from the power system to each block of the base station 10, a path (a second path) 142 for transmitting the power from the battery 12 thereto, a path (a third path) 143 for transmitting the power from the PV thereto, and a switch (hereinafter, referred to as SW) 144 for selectively switching the respective paths.

In FIG. 2, although the paths for transmitting the power from the SW 144 to the communication unit 13 are illustrated, respective paths for transmitting the power from the SW 144 to other blocks (for example, the control unit 17) may be also provided actually.

On the first path 141, a detection unit 145 is provided to detect a stoppage (a blackout) of the power supply from the power system. An existing technology can be used as a method of detecting the blackout. Upon detecting the blackout, the detection unit 145 notifies the control unit 17 of the detection of the blackout.

The measurement unit 15 measures the power (hereinafter, referred to as a remaining power amount) accumulated in the battery 12 under the control of the control unit 17. Upon measuring the remaining power amount, the measurement unit 15 outputs the measured result to the storage unit.

The storage unit 16 stores various information to be used for the control by the control unit 17. In the present embodiment, the storage unit 16 stores information indicating the remaining power amount obtained by the measurement unit 15.

The control unit 17 controls various functions of the base station 10. In the present embodiment, the control unit 17 includes a communication control unit 171 and a power control unit 172.

The communication control unit 171 controls the communication unit 13. Specifically, the communication control unit 171 controls radio communication (communication by the radio communication unit 131) with the radio terminal 20 and communication (communication by the network communication unit 132) using the X2 interface and the S1 interface.

The communication control unit 171 controls the network communication unit 132 to obtain the information (hereinafter, referred to as remaining power amount information) indicating the remaining power amount of the battery 12 from the storage unit 16 and to transmit the obtained remaining power amount information to another base station by using the X2 interface. Triggered by reception of a transmission request of the remaining power amount information from another base station, the communication control unit 171 may control the network communication unit 132 to transmit the remaining power amount information to the another base station.

Here, the remaining power amount information may be a value (wattage (W)) of the remaining power amount of the battery 12, and may be an index (for example, Full: "11", Middle: "10", Low: "01", Empty: "00") indicating a level of the remaining power amount of the battery 12.

In addition, when the network communication unit 132 receives the remaining power amount information of another base station from another base station by using the X2 interface, the communication control unit 171 performs control for adjusting a load of the base station and/or a load of the another base station on the basis of the received remaining power amount information.

For example, as a result of the comparison of the remaining power amount of another base station with the remaining power amount of the base station, when it is determined that the remaining power amount of the another base station is less than that of the base station, the communication control unit 171 performs control for increasing the number of radio terminals 20 to be accommodated in the base station. For example, the communication control unit 171 performs a handover process so as to allow the base station to be preferred as a handover destination, or adjusts a handover parameter. Alternatively, the communication control unit 171 may adjust a cell reselection parameter so as to allow the base station to be preferred as a standby destination.

Further, as a result of the comparison of the remaining power amount of another base station with the remaining power amount of the base station, when it is determined that the remaining power amount of the base station is less than that of the another base station, the communication control unit 171 performs control for decreasing the number of radio terminals 20 to be accommodated in the base station. For example, the communication control unit performs the handover process so as to allow the another base station to be preferred as the handover destination, or adjusts the handover parameter. Alternatively, the communication control unit may adjust the cell reselection parameter so as to allow the another base station to be preferred as the standby destination.

The power control unit 172 controls the SW 144 and the battery 12. When the blackout is detected by the detection unit 145, the power control unit 172 controls the SW 144 to supply the power from the battery 12 to the respective blocks. When the base station 10 is provided with the PV 11, the power control unit 172 controls so as to supply the power not only from the battery 12 but also from the PV 11. In this case, when discharge control of the battery 12 is performed, the power control unit 172 preferably controls such that a deficit of the generated power by the PV 11 is covered by the battery 12 on the basis of time zone or weather information, for example.

Moreover, the power control unit 172 controls the measurement unit 15. When the detection unit 145 detects the blackout, the power control unit 172 controls the measurement unit 15 to start the measurement of the remaining power amount of the battery 12. The measurement is periodically performed (for example, every 20 msec to several minutes). After a predetermined time elapses from the detection of the blackout, the measurement of the remaining power amount of the battery 12 may be started. Further, the power control unit 172 controls the measurement unit to execute the measurement until 15 the power supply from the power system is resumed (so that the measurement is not stopped until the power supply is resumed).

Furthermore, the power control unit 172 controls the storage unit 16. The power control unit 172 stores the measured result of the remaining power amount in the storage unit 16. The power control unit 172 updates the remaining power amount information stored in the storage unit 16 whenever the measurement is performed. As described above, the remaining power amount information stored in the storage unit 16 is used by the communication control unit 171.

(1.3) Operation of Base Station

Figure 3:
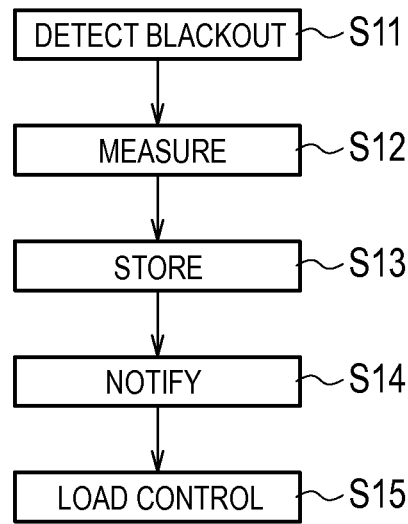
FIG. 3 is an operation flowchart of the base station according to the first embodiment.

Next, an operation of the base station 10 at the time of detecting the blackout is explained. FIG. 3 is an operation flowchart of the base station 10 at the time of detecting the blackout.

As illustrated in FIG. 3, in step S11, the detection unit 145 detects the blackout.

In step S12, when the blackout is detected by the detection unit 145, or after a predetermined time elapses from the detection of the blackout, the power control unit 172 controls the measurement unit 15 to start the measurement of the remaining power amount of the battery 12.

In step S13, the power control unit 172 stores the measured result of the remaining power amount in the storage unit 16.

In step S14, the communication control unit 171 controls the network communication unit 132 to obtain the remaining power amount information from the storage unit 16 and to transmit the obtained remaining power amount information to another base station by using the X2 interface. Triggered by reception of a transmission request of the remaining power amount information from another base station, the communication control unit 171 may control the network communication unit 132 to transmit the remaining power amount information to the another base station.

In step S15, the communication control unit 171 performs load control for adjusting a load of the base station and/or a load of another base station. The communication control unit 171 performs handover control in response to a result of the comparison of the remaining power amount of the base station with the remaining power amount of another base station. For example, when the remaining power amount of the battery of another base station is greater than the remaining power amount of the battery of the base station, and also when the remaining power amount of the battery of the another base station is equal to or greater than a predetermined value, the communication control unit 171 selects the another base station as a handover destination of the radio terminal 20 subordinate to the base station, and performs the handover process to the another base station.

(1.4) Specific Example of Signaling Between Base Stations

Hereinafter, a specific example of signaling between the base stations in transmitting and receiving the remaining power amount information will be described.

(1.4.1) Specific Example 1

Figure 4:
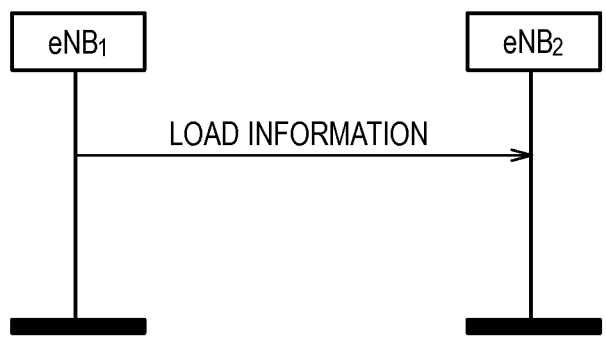
FIG. 4 is a sequence diagram of a specific example 1 of signaling between the base stations according to the first embodiment.

FIG. 4 is a sequence diagram of a specific example 1 of signaling between the base stations in transmitting and receiving the remaining power amount information. In FIG. 4, one of the respective base stations 10 adjacent to each other is denoted by $eNB_1$, and the other is denoted by $eNB_2$.

As illustrated in FIG. 4, The $eNB_1$ transmits the remaining power amount information, while being included in a LOAD INFORMATION message, to the $eNB_2$ by using the X2 interface. The $eNB_2$ receives the LOAD INFORMATION message including the remaining power amount information by using the X2 interface.

FIG. 5 is a diagram for describing information elements (IEs) of the LOAD INFORMATION message. Except for an underlined part of FIG. 5, IEs are the same as those of a LOAD INFORMATION message defined by a 3GPP standard (see, for example, 3GPP TS 36.423 V10.1.0 "9.1.2.1 LOAD INFORMATION").

As illustrated in FIG. 5, the LOAD INFORMATION message includes a Battery Indication IE as the remaining power amount information in addition to IEs of an existing LOAD INFORMATION message.

The LOAD INFORMATION message includes IDs of cells (source cells) of a transmission source of this message, and is transmitted for each source cell. Thus, when one base station forms a plurality of cells and a different battery 12 is provided in each of the plurality of cells, it is possible to transmit a different Battery Indication IE for each source cell.

In addition, the LOAD INFORMATION message includes the Battery Indication IE indicating the remaining power amount, and each IE (UL Interference Overload Indication, UL High Interference Information, and Relative Narrowband Tx Power, for example) for interference control between base stations as options, but it is preferable that the Battery Indication IE needs to be included in the LOAD INFORMATION message at the time of detecting the blackout.

(1.4.2) Specific Example 2

Figure 6:
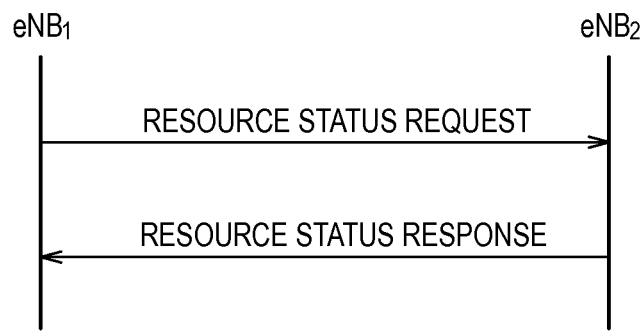
FIG. 6 is a sequence diagram of a specific example 2 of signaling between the base stations according to the first embodiment (part 1).
Figure 7:
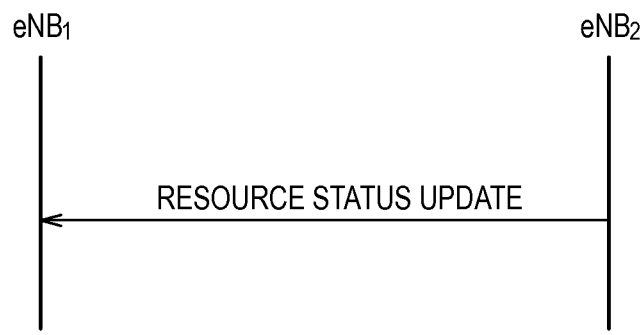
FIG. 7 is a sequence diagram of a specific example 2 of signaling between the base stations according to the first embodiment (part 2).

FIG. 6 and FIG. 7 are sequence diagrams of a specific example 2 of signaling between the base stations in transmitting and receiving the remaining power amount information. In FIG. 6 and FIG. 7, one of the base stations 10 adjacent to each other is denoted by $eNB_1$, and the other is denoted by $eNB_2$.

As illustrated in FIG. 6, the $eNB_1$ transmits a RESOURCE STATUS REQUEST message including the transmission request of the remaining power amount information to the $eNB_2$ by using the X2 interface. The $eNB_2$ receives the RESOURCE STATUS REQUEST message including the transmission request of the remaining power amount information by using the X2 interface.

The $eNB_2$ transmits a RESOURCE STATUS RESPONSE message which is a positive response to the RESOURCE STATUS REQUEST message to the $eNB_1$ by using the X2 interface. The $eNB_1$ receives the RESOURCE STATUS RESPONSE message by using the X2 interface.

The RESOURCE STATUS REQUEST message is configured to be able to designate one entry or a plurality of entries from among a plurality of items to be transmitted (items to be measured). However, when all the designated items to be transmitted are not executed, a RESOURCE STATUS Failure message is transmitted instead of the RESOURCE STATUS RESPONSE message.

As illustrated in FIG. 7, the $eNB_2$ which has transmitted the RESOURCE STATUS RESPONSE message performs the measurement according to the condition designated by the RESOURCE STATUS REQUEST message, and periodically transmits a RESOURCE STATUS UPDATE message indicating the measured result to the $eNB_1$.

FIG. 8 is a diagram for describing IEs of the RESOURCE STATUS REQUEST message. Except for an underlined part of FIG. 8, IEs are the same as those of a RESOURCE STATUS REQUEST message defined by the 3GPP standard (see, for example, 3GPP TS 36.423 V10.1.0 "9.1.2.11 RESOURCE STATUS REQUEST").

As illustrated in FIG. 8, the RESOURCE STATUS REQUEST message is different from an existing RESOURCE STATUS REQUEST message in that the remaining power amount information is configured to be able to be designated in Report Characteristics for designating the items to be transmitted (items to be measured).

Specifically, the Report Characteristics is configured as a bit string in which positions of bits are associated with the items to be transmitted (items to be measured). That is, the first bit corresponds to PRB Periodic, the second bit corresponds to TNL load Ind Periodic, the third bit corresponds to HW Load Ind Periodic, the fourth bit corresponds to Composite Available Capacity Periodic, the fifth bit corresponds to ABS Status Periodic, and the sixth bit corresponds to Battery Status Periodic. Here, the bit (the sixth bit) corresponding to the Battery Status Periodic being "1" corresponds to request to transmit the Battery Status IE.

Here, Battery Status corresponds to the remaining power amount information. PRB indicates the number of usage of PRB (Physical Resource Block) which is a unit for assigning a time frequency resource, TNL load Ind indicates a load of a backhaul between the base station and the core network, HW Load Ind indicates a hardware load of the base station, Composite Available Capacity indicates capacity classes which is an indicator indicating relative communication capacity of the base station and a percentage of available communication capacity among them. Moreover, the RESOURCE STATUS REQUEST message is configured to designate a period at which the report (the transmission) of the measured result is performed by Reporting Periodicity.

The RESOURCE STATUS REQUEST message includes, as the transmission object, PRB, TNL load Ind, HW Load Ind, Composite Available Capacity, and Battery Status, for example, as options. However, it is desired that the Battery Status needs be designated as the transmission object at the time of detecting the blackout.

FIG. 9 is a diagram for describing IEs of the RESOURCE STATUS UPDATE message. Except for an underlined part of FIG. 9, IEs are the same as those of a RESOURCE STATUS UPDATE message defined by the 3GPP standard (see, for example, 3GPP TS 36.423 V10.1.0 "RESOURCE STATUS UPDATE").

As illustrated in FIG. 9, the RESOURCE STATUS UPDATE message includes the Battery Status IE as the remaining power amount information in addition to IEs of an existing RESOURCE STATUS UPDATE message.

The RESOURCE STATUS UPDATE message is transmitted for each cell. Thus, when one base station forms a plurality of cells and the different battery 12 is provided in each of the plurality of cells, a different Battery Status IE can be transmitted for each cell.

(1.5) Effects of First Embodiment

As described above, according to the first embodiment, each of the base stations 10 can perform load control taking into account the remaining power amount of another base station 10.

Accordingly, by reducing a load of the base station 10 having a small remaining power amount, power consumption of the base station 10 can be reduced, so that it is possible to extend the drivable time of the base station 10.

Therefore, when blackout occurs, in particular, it is possible to prevent an incommunicable area from occurring in a service area of the mobile communication system 1.

Furthermore, by adding the IEs of the remaining power amount information to the message defined by the 3GPP standard without defining a new message, it is possible to maintain compatibility with the existing standard.

(1.6) Modification of First Embodiment

In the aforementioned first embodiment, it has been described that when the blackout is detected, or after a predetermined time elapses from the detection of the blackout, the transmission or the transmission request of the remaining power amount information is performed.

Recently, in order to avoid the blackout of the entire system, a power system called a planned blackout (a rolling blackouts) where the blackout is systematically performed sequentially for each region is instituted, and thus it is possible to previously know a time (a period of time) when the blackout occurs.

Thus, in the present modification, on the basis of information on the planned blackout (hereinafter, referred to as planned blackout information), before a time when the blackout is planned, the transmission or transmission request of the remaining power amount information is started. Specifically, the power control unit 172 of the base station 10 obtains the planned blackout information received by the network communication unit 132 from the network side, starts the measurement of the remaining power amount of the battery 12 before an estimated time to start the blackout on the basis of the obtained planned blackout information, and starts the transmission or transmission request of the remaining power amount information.

(2) Second Embodiment

In the above-described first embodiment, an example where the present invention is applied to the MLB (Mobility Load Balancing) technology which is one of SON technologies is described. In the second embodiment, an example where the present invention is applied to an ES (Energy Saving) technology which is one of SON technologies will be described. In the second embodiment, differences from the aforementioned first embodiment are explained.

(2.1) Operation of Base Station

Figure 10:
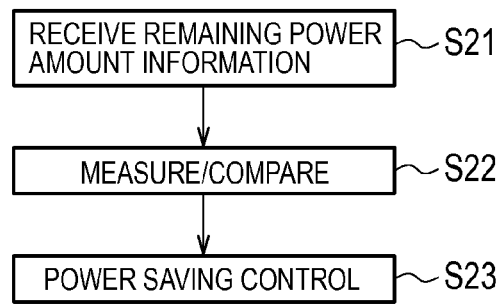
FIG. 10 is an operation flowchart of a base station according to the second embodiment.

FIG. 10 is an operation flowchart of the base station 10 according to the second embodiment.

As illustrated in FIG. 10, in step S21, the network communication unit 132 receives the remaining power amount information from another base station.

In step S22, the power control unit 172 controls the measurement unit 15 to measure the remaining power amount of the battery 12.

In step S23, the power control unit 172 compares the remaining power amount of the base station with the remaining power amount of another base station, and performs power saving control in response to the result of the comparison. For example, when the remaining power amount of the another base station is smaller than the remaining power amount of the base station, and also when the remaining power amount of the base station is smaller than a threshold value, the power control unit 172 controls so as to set transmission power corresponding to a part of cells formed by the radio communication unit 131 to be zero, or so as to decrease transmission power corresponding to a part or all of cells formed by the radio communication unit 131. When the transmission power corresponding to a part of cells formed by the radio communication unit 131 is set to zero (turned off), the notification that the transmission power is set to be zero is presented to the another base station.

As the result of the power saving control, when the remaining power amount of the another base station is smaller than the remaining power amount of the base station, it is desired that the power saving control needs be stopped to be returned to its original state.

(2.2) Specific Example of Signaling

(2.2.1) Specific Example 1

Figure 11:
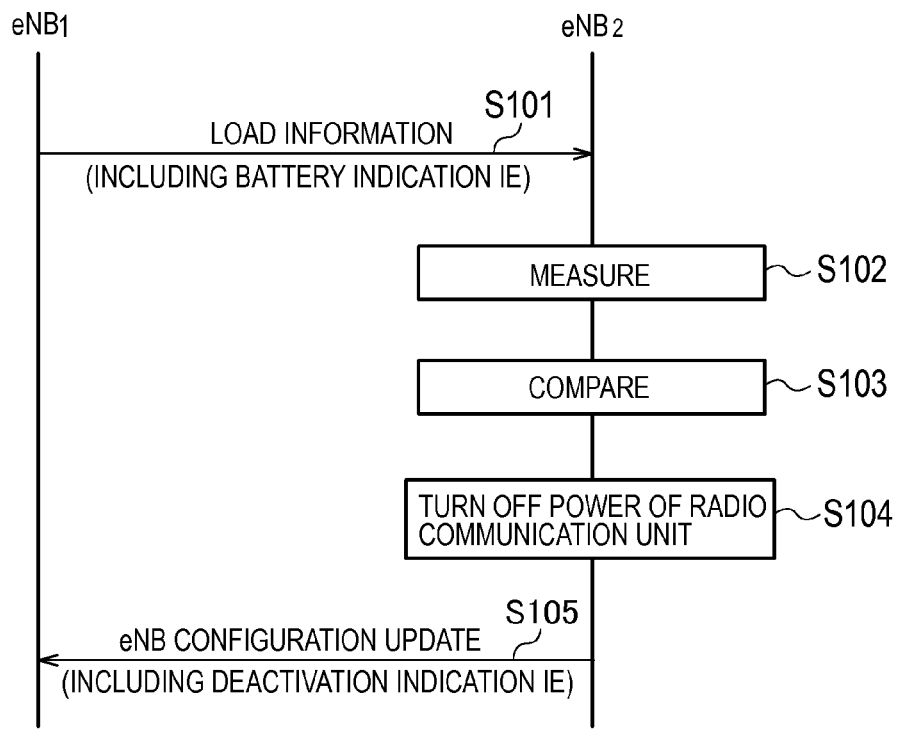
FIG. 11 is a sequence diagram of the specific example 1 of signaling between the base stations according to the second embodiment.

FIG. 11 is a sequence diagram of a specific example 1 of signaling between the base stations in transmitting and receiving the remaining power amount information. In FIG. 11, one of the respective base stations 10 adjacent to each other is denoted by $eNB_1$, and the other is denoted by $eNB_2$.

As illustrated in FIG. 11, in step S101, the $eNB_1$ transmits the LOAD INFORMATION message including the Battery Indication IE to the $eNB_2$ by using the X2 interface. The $eNB_2$ receives the LOAD INFORMATION message including the Battery Indication IE by using the X2 interface.

In step S102, the $eNB_2$ measures the remaining power amount of the base station.

In step S103, the $eNB_2$ compares the remaining power amount of another base station ($eNB_1$) with the remaining power amount of the base station ($eNB_2$). Here, the remaining power amount of the base station ($eNB_2$) is assumed to be smaller than the remaining power amount of the another base station ($eNB_1$).

In step S104, in response to the assumption that the remaining power amount of the base station ($eNB_2$) is smaller than the remaining power amount of the another base station ($eNB_1$), the $eNB_2$ sets the transmission power corresponding to a part of cells formed by the radio communication unit 131 to be zero (turned off). When a carrier aggregation technology that uses a plurality of component carriers is applied, the eNB2 may set the transmission power corresponding to a part of the component carriers to be zero (turned off).

In step S105, the $eNB_2$ transmits, to the $eNB_1$, an ENB CONFIGURATION UPDATE message including Deactivation Indication IE for notifying the cells (or the component carriers) which have been turned off by using the X2 interface.

(2.2.2) Specific Example 2

Figure 12:
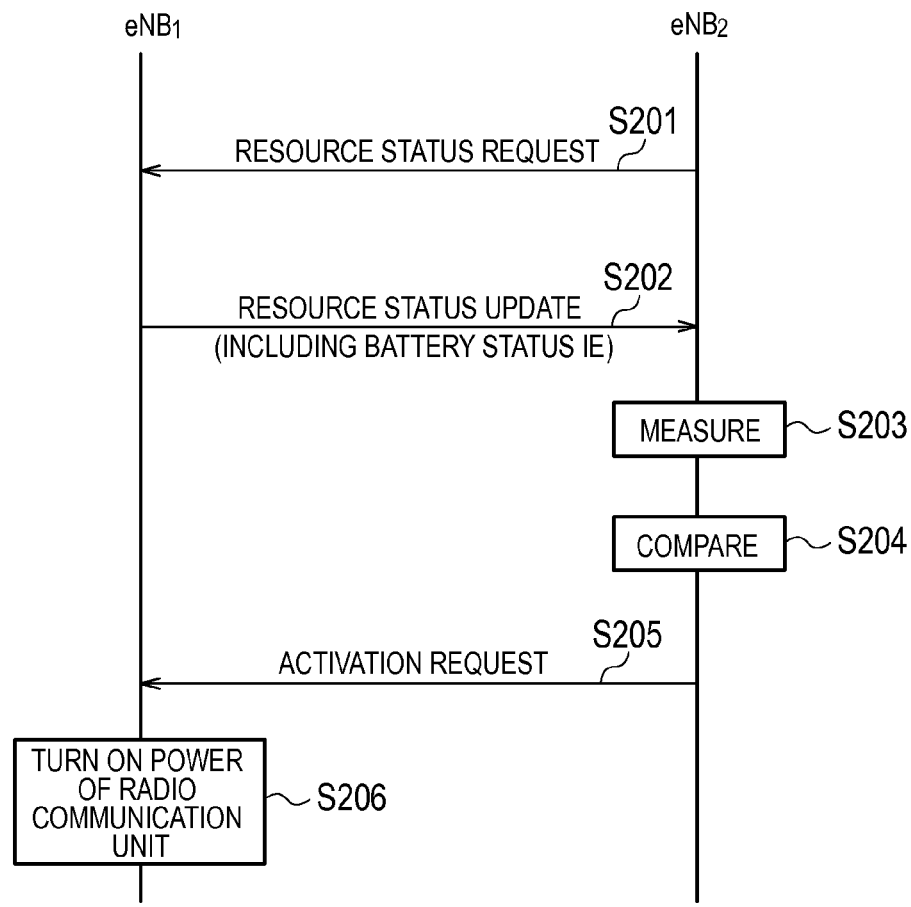
FIG. 12 is a sequence diagram of the specific example 2 of signaling between the base stations according to the second embodiment.

FIG. 12 is a sequence diagram of a specific example 2 of signaling between the base stations in transmitting and receiving the remaining power amount information. In FIG. 12, one of the respective base stations 10 adjacent to each other is denoted by eNB$_1$, and the other is denoted by eNB$_2$. Further, in a starting point of this sequence, at least a part of cells (or component carriers) of the eNB$_1$ are assumed to be turned off.

As illustrated in FIG. 12, in step S201, the eNB$_2$ transmits a RESOURCE STATUS REQUEST message which has designated the Battery Status as the transmission object to the eNB$_1$ by using the X2 interface. The eNB$_1$ receives the RESOURCE STATUS REQUEST message which has designated the Battery Status as the transmission object by using the X2 interface. After receiving the RESOURCE STATUS REQUEST message, the eNB$_1$ measures the remaining power amount of the base station.

In step S202, the eNB$_1$ transmits a RESOURCE STATUS UPDATE message including the Battery Status IE indicating the measured remaining power amount of the base station to the eNB$_2$ by using the X2 interface. The eNB$_2$ receives the RESOURCE STATUS UPDATE message including the Battery Status IE by using the X2 interface.

In step S203, the eNB$_2$ measures the remaining power amount of the base station.

In step S204, the eNB$_2$ compares the remaining power amount of the another base station (eNB$_1$) with the remaining power amount of the base station (eNB$_2$). Here, the remaining power amount of the base station (eNB$_2$) is assumed to be smaller than the remaining power amount of the another base station (eNB$_1$).

In step S205, in response to the assumption that the remaining power amount of the base station (eNB$_2$) is smaller than the remaining power amount of the another base station (eNB$_1$), the eNB$_2$ transmits an ACTIVATION REQUEST message for requesting to turn on at least a part of cells (or component carriers) of the another base station (eNB$_1$) to the eNB$_1$ by using the X2 interface. The eNB$_1$ receives the ACTIVATION REQUEST message by using the X2 interface.

In step S206, in response to the reception of the ACTIVATION REQUEST message, the eNB$_1$ turns on a part of cells (or component carriers) that have been turned off.

(2.3) Effect of Second Embodiment

As explained above, according to the second embodiment, each of the base stations 10 can perform the power saving control taking into account the remaining power amount of another base station 10.

Thus, power consumption of the base station 10 having a small remaining power amount can be reduced, so that it is possible to extend a drivable time of the base station 10. In the present embodiment, since a part of cells of the base station 10 are turned off, there is a possibility that the incommunicable area occurs. However, if cells of the base stations adjacent to each other are in an on-state, there occurs no large incommunicable area.

Accordingly, when blackout occurs, in particular, it is possible to prevent the large incommunicable area from occurring in the service area in the mobile communication system 1.

(3) Other Embodiments

Thus, the present invention has been described with the embodiment. However, it should not be understood that those descriptions and drawings constituting a part of the present disclosure limit the present invention. From this disclosure, a variety of alternate embodiments, examples, and applicable techniques will become apparent to one skilled in the art.

In the aforementioned embodiments, although an example where the remaining power amount information is transmitted and received using the X2 interface is described, the remaining power amount information may be transmitted and received using the S1 interface. For example, the mobility management device MME may manage the remaining power amount of each of the subordinate base stations 10 to reduce a load of the base station 10 having a small remaining power amount, or may control each of the base stations 10 to reduce power consumption of the base station 10 having a small remaining power amount. Alternatively, the mobility management device MME may relay the remaining power amount information transmitted and received between the base stations 10.

In the above-described embodiments, it has been that when the blackout is detected, after a predetermined time elapses from the detection of the blackout and before a time when the blackout is planned, on the basis of the planned blackout information, the transmission or transmission request of the remaining power amount information is performed. However, in a mobile communication system having a plurality of base stations 10 to be described below, each of the base stations 10 may usually perform the transmission or transmission request of the remaining power amount information to another base station 10.

Specifically, in the case of the base station 10 driven by the power from the PV 11, the battery 12, and the power system, the power control unit 172 of the base station 10 controls so as to charge power of night time zone which is cheaper than power price of daytime zone in the battery 12, and to drive the base station 10 by the power accumulated in the battery 12 after, for example, 7 a.m. At this time, the power control unit 172 controls the base station 10 to appropriately consume the power generated in the PV 11. When there are deficits in the power from the battery 12 and the PV 11, the power control unit 172 controls to drive the base station 10 by the power from the power system urgently. In the case of such a base station 10, since the battery 12 is one of main power supplies, each one of the base stations 10 periodically performs the transmission or transmission request of the remaining power amount information, so that the base station 10 can know the remaining power amount information of another base station 10. Accordingly, it is possible to appropriately execute the MLB or ES, for example, taking into account power circumstance.

Thus, it should be understood that the present invention includes various embodiments, for example, that are not described herein.

In addition, the entire content of Japanese Patent Application No. 2011-119767 (filed on May 27, 2011) is incorporated in the present specification by reference.

INDUSTRIAL APPLICABILITY

According to the present invention, it is possible to optimize settings of a base station while taking into account a battery condition.

The invention claimed is:

1. A communication control method in a base station that includes a battery and is driven by power supplied from a power system or power supplied from the battery, the method comprising steps of:

starting a measurement of a remaining power amount of the battery when a power supply from the power system is stopped;

transmitting first remaining power amount information indicating the remaining power amount of the battery to another base station;

when receiving second remaining power amount information indicating a remaining power amount of a battery of the other base station from the other base station, comparing the remaining power amount corresponding to the second remaining power amount information with the remaining power amount corresponding to the first remaining power amount information; and executing a process for turning over radio terminals served by the base station to the other base station when the remaining power amount corresponding to the second remaining power amount information exceeds the remaining power amount corresponding to the first remaining power amount information, as a result of comparison.

2. The communication control method according to claim 1, wherein
in the transmission step, the first remaining power amount information indicating the remaining power amount of the battery is periodically transmitted.

3. The communication control method according to claim 1, wherein
the transmission step is executed based on a stoppage of the power supply from the power system.

4. The communication control method according to claim 3, further comprising:
a step of detecting the stoppage of the power supply from the power system, wherein
the transmission step includes a step of starting the transmission of the first remaining power amount information indicating the remaining power amount of the battery or requesting the transmission of the second remaining power amount information indicating the remaining power amount to the another base station, when the stoppage of the power supply from the power system is detected or after a predetermined time elapses from the detection of the stoppage of the power supply from the power system.

5. The communication control method according to claim 3, further comprising:
a step of obtaining information indicating an estimated time when the power supply from the power system is stopped, wherein the transmission step includes a step of starting the transmission of the first remaining power amount information indicating the remaining power amount of the battery or requesting the transmission of the second remaining power amount information indicating the remaining power amount to the another base station, a predetermined time prior to the estimated time when the power supply from the power system is stopped.

6. The communication control method according to claim 1, further comprising:
a step of receiving a transmission request from the another base station by using an interface, wherein
the transmitting step is executed in response to the transmission request from the another base station.

7. The communication control method according to claim 1, wherein
in the transmission step, the first remaining power amount information indicating the remaining power amount of the battery is transmitted while being included in a LOAD INFORMATION message or a RESOURCE STATUS UPDATE message defined by a 3GPP standard.

8. A base station that includes a battery and is driven by power supplied from a power system or power supplied from the battery, the base station comprising:
a processor configured to execute processes of:
starting a measurement of a remaining power amount of the battery when a power supply from the power system is stopped;
transmitting first remaining power amount information indicating the remaining power amount of the battery to another base station;
when receiving second remaining power amount information indicating a remaining power amount of a battery of the other base station from the other base station, comparing the remaining power amount corresponding to the second remaining power amount information with the remaining power amount corresponding to the first remaining power amount information; and
turning over radio terminals served by the base station to the other base station when the remaining power amount corresponding to the second remaining power amount information exceeds the remaining power amount corresponding to the first remaining power amount information, as a result of comparison.

* * * * *